Figure 1:
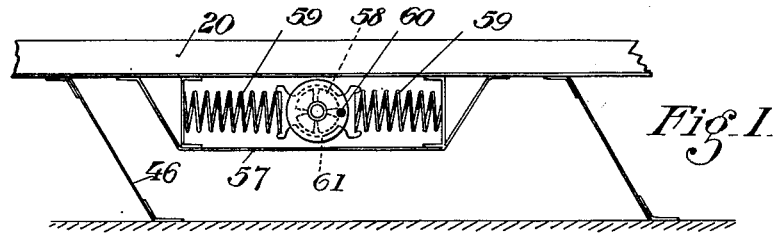

June 16, 1931. H. HEYMANN ET AL 1,810,882
CONVEYING OF MATERIAL
Original Filed Oct. 27, 1925

Inventors:
Hans Heymann
Ernst Lehr

Patented June 16, 1931

1,810,882

UNITED STATES PATENT OFFICE

HANS HEYMANN AND ERNST LEHR, OF DARMSTADT, GERMANY, ASSIGNORS TO THE FIRM: CARL SCHENCK, EISENGRESSEREI UND MASCHINENFABRIK DARMSTADT G. M. B. H., OF DARMSTADT, GERMANY

CONVEYING OF MATERIAL

Original application filed October 27, 1925, Serial No. 65,160, and in Germany October 31, 1924. Divided and this application filed January 22, 1927. Serial No. 162,808.

This application is a division of our application Serial No. 65,160, filed October 27, 1925.

Our invention refers to the conveying of pulverulent or pasty materials such as flour, sand, and the like, more especially in a horizontal or slightly inclined plane. It is an object of our invention to provide means whereby the conveying of such materials can be effected more efficiently and with less expenditure of power than was hitherto possible.

In shaking troughs as hitherto designed the control of the forces which are produced by the conveying operation and which are transmitted to the support of the trough, causes considerable difficulties. These difficulties are increased in proportion to the increase of frequency of the oscillations imparted to the trough, such increase of frequency being, however, very desirable for the protection of the material to be conveyed. Particular difficulties are encountered if the structure supporting the trough is unsuitable for withstanding large forces, for instance in the case where the trough is mounted in the upper story of a factory building, where the building walls are exposed to heavy strains.

All these difficulties are obviated and any desirable frequency of oscillation can be used even with conveyers mounted on light foundations if, according to the present invention a mass is oscillatorily secured to the conveying trough, being counteracted by spring action in the direction of conveying, which is set oscillating by the periodic impulses, which are imparted to it with the natural frequency of oscillation of the system, comprising the conveying trough, the springs, and the oscillatory mass. The return pressure produced by the springs acted upon by the oscillating mass acts towards setting the conveying trough oscillating with the same frequency. In this manner the conveying trough to a certain extent establishes an equilibrium with the mass acting upon it, so that only comparatively small forces are transmitted onto the supporting structure, these forces being not substantially larger than the proper weight of the conveyer. The well known resilient supports of the trough, which are preferably inclined relative to the ground, can now be made so thin as to be just sufficient to guide the conveyer, and in comparison with the extremely powerful springs previously used impart to the conveyer only so low a resiliency that the natural frequency of oscillations of the trough is materially lower than the natural frequency of oscillations of the driving mass resiliently mounted on the trough.

A further material advantage inherent in the new conveyor consists therein that the trough is rendered substantially insensitive to variations in the charge of the conveyer. In the case of conveyers intended to be operated in resonance, this is of the greatest importance. A conveyer of this kind is designed after the manner of an oscillatory system and in consequence thereof an increase of the charge of the conveyer will considerably reduce its actual frequency of oscillation. Provided that the driving engine is operated with a permanently constant number of revolutions, great difficulties are encountered in trying to keep the conveyer oscillating in resonance. This drawback is altogether obviated by this invention, inasmuch as the conveyer itself to a certain extent only forms the foundation for the driving mass, which is supported by it and which for instance amounts only to one tenth to one twentieth of the conveyer itself.

In this combination the natural frequency of oscillation of the driving mass exerts only an insignificant influence on the frequency of the conveyer itself.

The driving mass can be set reciprocating at the desired frequency in any desired manner. A very simple mode of operation results if the impulses are imparted to it by the centrifugal action of unbalanced masses, the axis of rotation of which is rigidly mounted in the oscillating mass. If compressed air, steam, or the like are available, the impulses acting on the oscillating mass can be imparted to it always at the correct frequency even in the case of fluctuations of pressure, if by means of a control dependent upon the position of the oscillating mass itself the driving medium is caused to act on this mass always at the moment when the mass tends to move away from the opposite wall of the chamber surrounding the driving medium, the exhaust of this medium being effected at any moment thereafter, for instance when the oscillatory mass is on its return stroke.

Figure 2:
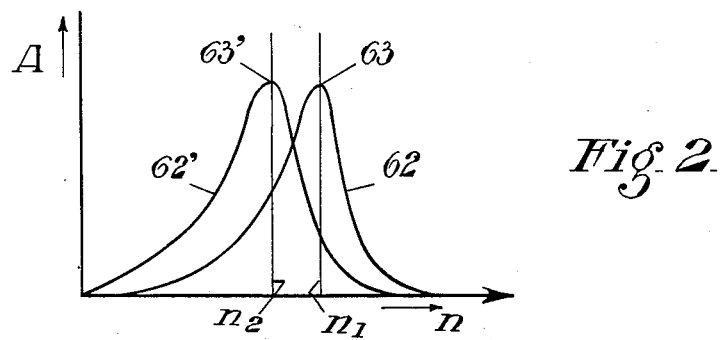
Figure 3:
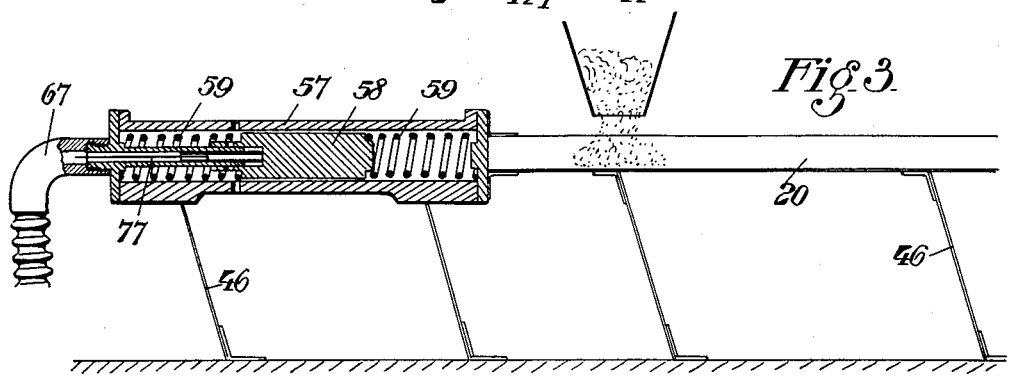
Figure 4:
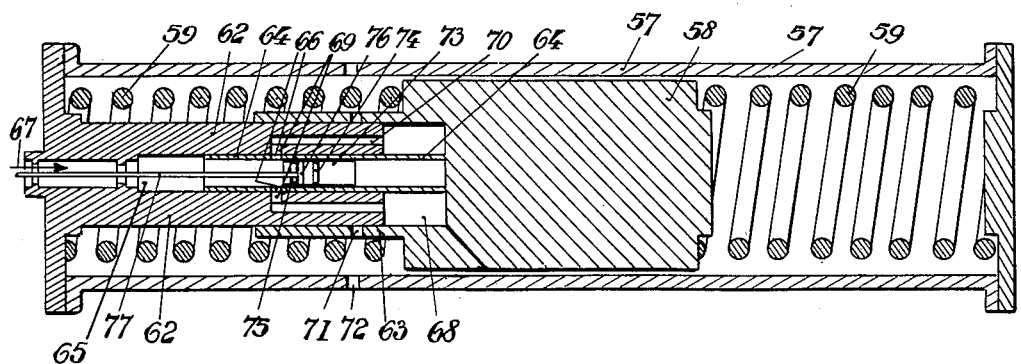

In the drawings affixed to this specification and forming part thereof two embodiments of our invention are illustrated diagrammatically by way of example. In the drawings Fig. 1 is a diagram showing a trough operated by the impact of an oscillating mass exposed to the reaction of springs, Fig. 2 is a diagram showing the most favorable manner of tuning the system operating this trough, Fig. 3 is an axial section of another modification, and Fig. 4 is a similar view, drawn to a larger scale, of the vibration producer shown in Fig. 3, comprising a reciprocatory mass adapted to be acted upon by compressed air, steam, or the like, means being provided for automatically governing the admission and exhaust of the driving medium in accordance with the requirements of the device.

Fig. 1 illustrates a conveying trough in which no driving forces and no spring reaction need be transmitted onto the foundation. The trough 20 is supported in a well known manner on inclined supports 46, which may also be replaced by pendulum supports or the like and which need not be stronger than required for carrying and guiding the trough, without showing any particular resiliency. At any desired point of the trough 20 a casing 57 is mounted, enclosing a mass 58 capable of reciprocating movement in the direction of conveyance or transport. This mass is supported and preferably also guided relative to the trough by suitable springs 59, which may be adjustable, in such manner that the reciprocable mass 58 together with the springs 59 and the mass of the trough forms an oscillatable system having a predetermined period of vibration.

If now the mass 58 is set vibrating in any desired way at or near this natural period of vibration, the supporting pressure of springs 59 will cause also the trough 20 to vibrate at the same speed. The forces produced by the vibration will balance each other outwardly in such manner that only very weak forces need be transmitted to the outside. For the same reason the strong supporting springs which are usually required in the case of heavy troughs operating in resonance can be dispensed with, no great supporting forces acting on the foundation, so that the manner of supporting the trough need be chosen merely in proportion to the proper weight of the trough and the material to be conveyed.

The mass 58 is set vibrating for example by means of an unbalanced mass 60 which can be set rotating by means of an electromotor 61 mounted in the mass 58 itself. This unbalanced mass can be displaced radially relative to the axis of the motor.

A conveying trough such as illustrated in Fig. 1 is not only particularly simple in construction but can also be used with a constant number of revolutions of the motor because the natural number of vibrations of the oscillatable system including the mass 58 and springs 59 is substantially independent of the weight of the material transported.

The oscillatable driving system 58, 59 is preferably tuned as shown in the diagram of Fig. 2 where the ordinates represent the amplitudes of the oscillatable system 58, 59, illustrated in dependency upon the number $n$ of rotations of the unbalanced mass 60 shown on the abscissæ. There results the well known resonance curve 62 with a very steeply ascending and descending point 63. This resonance point 63 of the amplitudes of the vibration occurs at no-load running at a number of revolutions $n_1$, while the maximum amplitude $63_1$ of the loaded trough is obtained at the lower number of revolutions $n_2$. According to the invention the system is so tuned that the natural number of vibrations of the driving system when the trough is fully loaded agrees with the number of rotations $n_2$ of the driving motor during service. Therefore, during no-load running which is governed by the curve 62, the trough will work on the ascending branch of the curve, i. e. before the resonance amplitude. In proportion as the trough is now loaded, the maximum amplitude is shifted from 63 to 63', in other words, the greater the quantity of material conveyed onto the trough, the greater will be the automatic increase in the amplitude of vibrations and in consequence thereof also in high degree its efficiency.

The trough can also be actuated by reciprocatory impulses which may be produced by any desired electrical, mechanical, or other sources of energy. If there is available, for instance steam or, as in the mining industry, compressed air for driving the trough, a device such as shown in Figs. 3 and 4 can be used. This device at the same time obviates the difficulties arising when transforming compressed air of greatly varying pressure into energy with rotary motion, these difficulties resulting in a great variance of the number of revolutions and of impulses. In the cases where the pressure varies, the driving force preferably acts directly on the reciprocating mass by means of a self-governed valve system which acts towards maintaining the resonance number of vibrations. A system of this kind is shown in Figs 3 and 4, where 20 is the conveying trough, 46 are the resilient supports carrying same, and 57 is a casing rigidly connected with the trough and enclosing a mass 58 which is arranged for free reciprocatory motion between the two springs 59, the proportions of the parts being so chosen that their natural period of vibration is equal to the period of vibrations of the trough during operation. Into the interior of casing 57 projects a cylinder 62 rigidly connected with the casing which is embraced by a hollow cylindrical extension 63 on the mass 58 so as to act like a piston, the parts being provided with a suitable packing to ensure a tight fit. To the mass or body 58 is further fixed a tube 64 which tightly fits and glides in a central boring 65 of the cylinder 62 and is provided with ports 66, through which the compresed air admitted at 67 can enter the cylindrical space 68 when the ports 66 register with similar cylindrical ports 69 formed in the cylinder 62 and which communicate with conduits 70 leading to the cylindrical chamber 68. The compressed air escapes through ports 71 provided in the extension 63 of the cylinder, these ports being controlled by the piston 62 and allowing the air to escape into the atmosphere. Within the main valve tube 64 is disposed an auxiliary valve 73 consisting of a short tube which glides in the main valve 64 with comparatively great friction. The auxiliary valve 73 is provided with two inner checks 74, 75 which alternately abut against disc 76 mounted on a rod 77 fixed in the air admission conduit of cylinder 62.

This device operates as follows:

If no compressed air is admitted, the mass 58 is kept by the springs 59 in neutral position in which the admission ports 66, 69 are open. On air being admitted it enters the cylindrical chamber 68 through boring 65, ports 66, 69 and conduit 70, and forces the mass 58 to the right. By moving to the right the admission of air is closed at a comparatively early moment inasmuch as the main valve 64 is carried along by the mass and in moving to the right covers the admission ports 69. According to whether it is desired to operate the device with more or less expansion of the compressed air, the exhaust port 71 is caused to be uncovered sooner or later. The mass 58 is thrown by the impulse received from the compressed air which suddenly enters, to the right, compressing the corresponding spring 59. During this movement the exhaust ports 71 are fully uncovered. They are covered only when the mass 58 during its return stroke to the left reaches the position in which the exhaust ports have been uncovered. If during the further movement of the mass 58 to the left the admission ports 66, 69 were now uncovered again, the mass 58 would at once be thrown back towards the right and only very small vibrations would result. This drawback is obviated by means of the auxiliary valve 73 in the following manner:

The auxiliary valve 73 is carried along by the inner wall of the main valve 64 as far as its checks 74, 75 admit it. About at the moment at which the admission port 66, 69 are covered during the movement of the mass 58 to the right, the check 75 of the auxiliary valve 73 abuts against the disc 76 of the rod 77 which retains it, while the parts 58 and 64 continue their movement to the right so that the auxiliary valve 73 is now forced to slide in the boring of the main valve 64. When the mass 58 has reached its dead centre point on the right and starts on its return stroke, the auxiliary valve 73 is carried along by friction in the boring of the main valve 64 until it has passed the distance between the checks 74, 75, and the right hand check 74 now abuts against disc 76. The auxiliary valve 73 is now arrested, while the main valve 64 continues its movement to the left together with the mass 58. However, in this position the auxiliary valve 73 covers the admission ports 66 of the main valve 64, if these ports come to register with the ports 69 of the cylinder 62. Although the ports 66 and 69 are now in register, no compressed air can enter the cylindrical chamber 63 during the movement of the mass 58 to the left.

After passing through the neutral position the mass 58 will continue moving to the left until its ginetic energy has been transformed into shock absorption and useful work. Inasmuch as in the example illustrated in the drawing the exhaust ports remain closed during this movement, the air enclosed in the chamber 68 will be compressed, however such compression has no injurious effect, but merely assists in the action of the springs 59.

During the movement of mass 58 to the left the check 74 of the auxiliary valve abuts against the fixed disc 76, so that the main valve 64 glides past the auxiliary valve. As soon, however, as the mass 58 and its main valve 64 have reached their dead centre position on the left and start on their return stroke to the right, the auxiliary valve 73 is carried along by the inner wall of the main valve 64 the short distance between the two checks until its left hand check 75 meets the disc 76. The auxiliary valve has now assumed its initial position so that shortly before the mass 58 has reached its neutral position, the ports 66, 69 are uncovered and admit compressed air into the cylindrical chamber 68, whereupon a fresh impulse acting on the oscillatable mass 58 forces it to the right again.

A device as just disclosed can be disposed on either side of the mass 58 so that this mass is operated upon on either side. The valve control described can be replaced by any other valve control acting in such manner that the driving medium such as compressed air always acts on the mass 58 only in one direction, while during the return stroke the admission is interrupted. It is for instance possible to dispense with the auxiliary valve and to impart to the main valve 64 shortly before it reaches its two dead centre positions a small rotation relatively to the mass 58 by means of suitable guiding means, whereby the ports 66 coincide with the ports 69 during one direction of movement, while during movement in the other direction the ports in consequence of the valve 64 having been rotated relatively to the mass 58 will assume a staggered position relative to the ports 69. We may further adopt other controlling devices of a similar kind, for instance a stop cock inserted in the air piping and which is turned one way and the other and opened or closed by means of corresponding projections or extensions of the oscillatable mass 58, before the admission ports 66, 69 are in register.

By being thus controlled the oscillatable mass 58 can only move according to its natural oscillation. It controls the supply of energy in such manner that the driving impulse always occurs at the right moment. The oscillatable mass can therefore only operate in resonance, the number of impulses per unit of time being entirely independent of variations in the pressure of the driving medium which may arise, in contradistinction to a drive by means of an ordinary compressed air engine with rotary crank shaft, where the number of rotations and in consequence also the impulses imparted to the trough would be influenced very materially by variations in the air pressure. In the present case such variations are merely capable of influencing the amplitude of vibration in an insignificant manner.

Preferably the mode of controlling, of spring suspension and so on, in other words all factors which may influence the supply of energy, amplitude of vibration, natural period of vibrations, and the like of the oscillatable system, are arranged for being adjusted. The amplitude of vibration of the mass 58 depends upon the proportion of the energy supplied to the resistances counteracting it and which consume part of this power. These resistances partly consist of the injurious braking effect, such as the friction in the piston and the valves, the inner friction of the springs, and the like, but the greater part consists of the useful braking effect, that is the energy which is withdrawn from the oscillating mass 58, and is transformed into motion of the material to be transported.

The term "trough" as used in the claims is meant to comprise also other than trough-shaped conveying means.

We wish it to be understood that we do not desire to be limited to the exact details of construction and operation shown and described for obvious modifications will occur to a person skilled in the art.

We claim:—

1. A conveying device comprising a conveying trough, supported for vibratory movement in the longitudinal direction, an oscillatable mass resiliently connected with and arranged for free vibratory movement relative to and in the same direction as said trough, and means for causing said mass to vibrate freely in such a manner that its linear displacement is of variable magnitude.

2. A conveying device comprising a conveying trough, a mass mounted for free vibration relative to and substantially in the same direction as said trough, a spring inserted between and connecting said trough and said mass, and means for causing said mass to vibrate freely in such a manner that its linear displacement is of variable magnitude.

3. A conveying device comprising a conveying trough, a freely vibratable mass resiliently connected with said trough and means for causing said mass to vibrate relative to and substantially in the same direction as said trough, the period of vibration of said mass approaching the period of the natural vibrations of the entire system comprising said trough, said mass and said resilient means, the said mass being adapted to vibrate freely in such a manner that its linear displacement is of variable magnitude.

4. A conveying device comprising a conveying trough, inclined resilient supports for supporting said trough for vibratory movement in the longitudinal direction, a freely vibratable mass resiliently connected with said trough and means for causing said mass to vibrate relative to and substantially in the same direction as said trough, the trough having therefore a materially lower natural frequency of vibration than the natural frequency of vibration of the vibratable mass connected with the trough.

5. A conveying device comprising a conveying trough supported for vibratory movement in the longitudinal direction, a vibration producer operatively connected with said trough comprising a freely reciprocatable mass and means connected with said mass for regulating its reciprocatory movements so as to maintain resonance between said producer and said trough.

6. A conveying device comprising a conveying trough supported for vibratory movement in the longitudinal direction and a vibration producer operatively connected with said trough comprising a freely reciprocatable mass and a self-controlled valve system in operative connection with said mass for regulating its movements so as to maintain resonance between said producer and said trough.

7. A conveying device comprising a conveying trough supported for vibratory movement in the longitudinal direction and a vibration producer operatively connected with said trough comprising a freely reciprocatable mass and means connected with said mass for controlling the supply of motive medium to said producer in dependency upon the reciprocatory movements of said mass so as to maintain resonance between said producer and said trough.

8. A conveying device comprising a conveying trough supported for vibratory movement in the longitudinal direction, a reciprocatable mass operatively connected with said trough, resilient means arranged to counteract the movements of said mass, a casing surrounding said mass, a cylinder and a piston forming part of said casing and aid mass, respectively, for cooperation with each other, means for admitting a pressure medium on one side of said piston for moving said mass to the opposite side and means governed by the cooperating parts for interrupting the admission of pressure medium during the return stroke of said mass.

9. A conveying device comprising a conveying trough supported for vibratory movement in the longitudinal direction, a reciprocatable mass connected with said trough, resilient means arranged to counteract the movements of said mass, a casing surrounding said mass, a cylinder and a piston forming part of said casing and said mass, respectively, for cooperation with each other, means for admitting a pressure medium on one side of said piston for moving said mass to the opposite side, and means comprising a main and an auxiliary valve governed by the cooperating parts for interrupting the admission of pressure medium during the return stroke of said mass.

In testimony whereof we affix our signatures.

HANS HEYMANN.
ERNST LEHR.